UNITED STATES PATENT OFFICE 2,391,951

WATER SOFTENING MATERIAL AND METHOD OF PREPARING SAME

Svein Dahl-Rode, New York, N. Y.

No Drawing. Application December 9, 1941,
Serial No. 422,239

13 Claims. (Cl. 252—181)

This invention relates to water-softening materials, namely, materials which are adapted to remove from water substances which impart so-called "hardness" to water. This invention also relates to method of manufacturing water-softening materials.

Water frequently contains minerals, particularly soluble compounds of calcium and magnesium which impart hardness to water. Various expedients have been resorted to for removing such impurities from water so as to make the water more suitable for drinking, use in boilers, use in laundering and the like. In order to remove hardness from water, many different base exchange compounds have been proposed and utilized heretofore that are adapted to remove the soluble compounds of calcium, magnesium and the like from hard water. Base exchange compounds which remove water-hardening materials from water with simultaneous liberation of alkali metal compounds that are not regarded as harmful in the water are usually known as zeolites. Zeolites occur both naturally and as a result of chemical synthesis. The most generally used zeolites are complex compounds containing an alkali metal, together with aluminum or silicon or both. When such compounds are placed in contact with hard water as by causing the hard water to flow through a granular mass of zeolite material, the mineral salts causing the water hardness are converted into insoluble compounds which remain on the zeolite and at the same time the alkali metal component of the zeolite is liberated. After the zeolite material has been exhausted by contact with hard water, it may be revived or regenerated by treating it with a suitable source of soluble alkali compound, e. g., sodium chloride, which is adapted to displace the deposited compounds of calcium, magnesium and the like and restore the original alkali content of the zeolite material.

I have found that coffee particles which have been treated with an alkaline alkali metal compound may be used as a water-softening material. The present invention is based upon my discovery that the water-softening characteristics of the treated coffee particles can be greatly improved by treating the coffee particles with an acid before the coffee particles are treated with the alkaline alkali metal compound. It is also very much to be preferred, according to the present invention, to treat the coffee particles not only with an acid but also with a metal salt solution before the coffee particles are treated with alkaline alkali metal compound. Also, in preferred practice, it is preferable to roast the coffee particles after the coffee particles have been treated with acid or with acid plus a soluble metal salt and before the coffee particles are treated with alkaline alkali metal compound. The alkaline alkali compound which I prefer to use is alkali metal silicate such as sodium silicate.

The coffee particles which may be used according to this invention may be either raw or roasted, ground or unground, and either before or after use of coffee for the preparation of a beverage. Preferably, the coffee that is used is coffee that has been ground to a granular condition inasmuch as the ground coffee particles are more porous and therefore are more readily treated according to this invention and after treatment accomplish more rapid water-softening than do coffee particles which have not been ground. Coffee which is in the form of beans or is in a ground condition is regarded herein as being in particle form. It is preferable to use coffee particles that have been utilized in the preparation of a beverage and from which soluble flavoring and coloring material has been removed.

In order to form a better understanding of the practice of this invention, it will be described in connection with a typical and preferred example thereof. According to this example, the coffee particles that are used are roasted and ground particles of the type commonly used as a beverage and from which coffee beverage has been extracted by an ordinary coffee-making operation. The coffee particles are the so-called coffee grounds which are normally discarded after the preparation of coffee beverage.

The coffee particles are first treated with an acid solution containing dissolved metal salt, which acid solution is made using the following materials:

| | | |
|---|---|---|
| Powdered ferrous sulphate | grams | 50 |
| Powdered manganese sulphate | do | 50 |
| Concentrated sulphuric acid | cc | 50 |
| Water | cc | 250 |

The coffee particles, which have previously been dried, are treated by incorporating them in the solution and then soaking them for about twenty-four hours. The coffee particles are then removed from the solution and dried. After drying, they preferably are again soaked in the solution for a period of about twenty-four hours and again are dried.

The dried particles are then roasted at a temperature which is preferably about 300° C. to about 350° C. for about four or five hours. This roasting causes the coffee particles to become quite hard and assume a hardened, granular form. After roasting, the coffee particles are cooled and are then washed with water to remove any excess salt or acid.

The coffee particles are next treated with an alkaline alkali metal compound which, according to the present example, is sodium silicate. Sodium silicate solution having a specific gravity of about 1.13 is suitable. The coffee particles may be soaked in the solution at ordinary temperatures for about twelve hours. The coffee particles are then washed with water and after washing may be dried.

The coffee particles which have been treated as above described constitute an excellent water-softening material of the base exchange type. The water-softening material can be used in the usual way as by passing a current of water down through a mass of the granular particles. The base exchange reaction by which water-hardening material is removed from the water is very rapid and the water can be passed through the water-softening material with a very free flow. The effectiveness of the new type of water-softening material is outstanding. Thus I have made water-softening material according to the present invention, a cubic foot (dry) of which will remove 10,000 grains of water-hardening material (calculated as calcium carbonate) from hard water. The effectiveness of my material is apparent when it is considered that so-called green sand, which is one of the most effective zeolite materials on the market at the present time, has an effectiveness such that one cubic foot (dry) removes in the neighborhood of 5,000 grains of water-hardening material (calculated as calcium carbonate) from hard water. My new water-softening material is very light and only weighs about 37 to about 40 pounds per cubic foot. By comparison, a material such as green sand weighs about 85 pounds per cubic foot.

In use, my new water-softening material tends to swell somewhat when placed in contact with water in a bed of the water-softening material. This swelling of the material does not, however, in any way interfere with the free flow of water through the water-softening material. When the capacity of the water-softening material to remove water-hardening materials from hard water has been largely exhausted, the water-softening material can be revivified, as, for example, by treatment with sodium chloride solution. Thus a two per cent. solution of sodium chloride may be caused to flow through the mass of water-softening material. The water-softening material can be revivified again and again and lasts much longer than ordinary zeolite and becomes discolored to a lesser extent.

The acid mentioned in connection with the foregoing example, namely, sulphuric acid, is regarded as preferable for the treatment of coffee particles in the preparation of water-softening materials according to this invention. While sulphuric acid is regarded as preferable, other acids may be used. Of the other acids, mineral acids such as hydrochloric acid, nitric acid, phosphoric acid, etc., are more effective than organic acids. However, organic acids such as acetic acid, oxalic acid and the like are somewhat effective and may be used in the practice of this invention.

As aforesaid, it is distinctly preferable to use a mineral salt in addition to acid in treating the coffee particles. Water-soluble manganese salts are regarded as preferable in the practice of this invention. However, salts of other metals may be used and in particular those water-soluble salts of metals found in groups 3, 4, 5, 6, 7 and 8 of the periodic table may be utilized. Examples of such salts are salts of iron, aluminum, chromium, molybdenum, lead, tin, antimony, titanium, etc. Of these salts, the water-soluble salts of metals contained in the group consisting of manganese, iron and aluminum are preferred. Mixtures of acids may be used and the salt may be a salt of more than one acid, e. g., the salt may be partly a chloride and partly a sulphate. Also, the metal that is used may be a mixture of a plurality of metals as in the foregoing example. The acid and salt may be applied in the same or in different baths. If the acid and salt cannot be mixed without forming a precipitate, the acid and salt are used sequentially. Thus, for example, the coffee particles may first be treated with a solution of lead acetate and thereafter treated with a solution of sulphuric acid, thus taking advantage of the fact that lead acetate is soluble while lead sulphate is substantially insoluble.

The alkaline alkali metal compound that is used may be any compound such as an alkali metal hydroxide, soda ash, trisodium phosphate, sodium silicate, sodium aluminate, or the like. All of these materials have a pronounced alkaline reaction as distinguished from a compound such as sodium chloride which does not have a substantial alkaline reaction. Those alkali metal compounds which have a distinct alkaline reaction are referred to generally as alkaline alkali metal compounds. Of these compounds, double salts of aluminum and silicon are to be preferred. There are various of these compounds and many of them are referred to as zeolites. The double salts of aluminum are referred to generally as alkali metal aluminates and the double salts of silicon are referred to generally as alkali metal silicates. Of the alkaline alkali metal compounds, the alkali metal silicates and the alkali metal aluminates are to be preferred, e. g., sodium silicate or sodium aluminate. Optimum hardness and durability are obtained using alkali metal silicate.

In the preparation of the new water-softening material, the sequence of operations may be varied. Ordinarily, it is convenient to treat the coffee particles with acid and with a metal salt solution simultaneously by treating the coffee particles with a metal salt solution to which acid has been added. However, the coffee particles may first be treated with acid and then be treated with metal salt solution, or vice versa. Moreover, the coffee particles may be treated with an acidified metal salt solution and thereafter treated either with a metal salt solution or with an acid solution. Also, the acidification of the coffee particles may be accomplished in other ways than by treating the coffee particles with an aqueous acid solution. Thus, for example, the coffee particles have been successfully converted to water-softening material according to this invention by treating the coffee particles with a metal salt solution, e. g., manganese sulphate and incorporating sulphur with the particles. The particles carrying sulphur and metal salt are then dried and roasted. During the roasting, the sulphur is oxidized to an acidic condition and results in the treatment of the coffee with an acid. Moreover, the coffee particles may be treated with acid in other ways, e. g., by exposure to hydrochloric acid in gaseous form.

The roasting step can be omitted, but is preferably included in the preparation of the new water-softening material. During the roasting step, the roasting is carried out at a temperature which reduces the coffee particles to a hard, granular condition. As aforesaid, a temperature of about 300 to about 350° C. is preferable for this purpose. Roasting in order to be expeditious should ordinarily be above about 300° C. On the other extreme roasting temperatures above about 500° C. have a deleterious effect on the coffee.

The washing step after the coffee has been treated with acid or acid plus mineral salts may also be omitted, but, by washing the coffee particles to remove excess salt or acid, the neutralization of the subsequently-added alkaline alkali metal material is reduced to a minimum with less wastage of this material and with more effective treatment of the coffee particles.

The reason why the coffee particles which have been treated according to the present invention have improved water-softening properties is not definitely understood, although it is believed that the acid treatment and metal salt treatment affects the coffee substance of the coffee particles so that the coffee particles when subsequently treated with an alkaline alkali metal compound have improved water-softening properties. Suffice it to say, that by extended experiments I have discovered that the treatments hereinabove described result in very marked improvements in the effectiveness of the treated coffee particles for use in softening water. When a metal salt is used in the initial steps of the treatment, the subsequent treatment of the coffee particles with an alkaline alkali metal compound will remove a good part of the metal from the coffee particles, but, notwithstanding the removal of the metal and the substitution therefor of alkaline alkali metal compound, the use of the metal in the initial steps of the treatment markedly improves the effectiveness of the resulting product.

In using coffee particles in accordance with this invention as a water-softening material, I have found that the capacity of coffee to liberate the flavor and color that are commonly associated with coffee does not detract from the usefulness of coffee particles in the practice of this invention. Especially when coffee has been ground and used in the preparation of a beverage and when the used coffee particles have been treated according to this invention, the tendency to deleteriously affect the color and taste of water is not noticeable. If raw unground coffee were to be used, for example, and if there were any tendency to discolor or adversely affect the flavor of water, the coffee could, of course, be extracted with hot water to remove soluble coloring and flavoring materials before being treated for use as a water-softening material, although such treatment ordinarily is not necessary. Normally, however, the coffee particles that are used in the practice of this invention would be coffee that has previously been used in the preparation of a beverage and which therefore has little tendency to discolor or adversely affect the flavor of water. In fact, it is one of the advantages of this invention that used coffee grounds which are for the most part a waste material find usefulness according to the present invention as an improved type of water-softening material.

It may also be mentioned that coffee particles which have been treated according to this invention and which embody this invention are also advantageous because they are effective in removing noxious odors from water treated therewith.

The new water-softening material can be used for softening water for use in laundries, boilers, hotels and in fact for any purpose and in substantially any type of water-softening installation. The improved water-softening material is notable for its high efficiency in softening hard water. It is also advantageous in that it permits free flow of water therethrough and has a very high capacity for effective regeneration.

While this invention has been described in connection with certain specific examples of the practice thereof, it is to be understood that this has been done merely for illustrative purposes and that the scope of this invention is to be governed by the language of the following claims.

I claim:

1. A method of preparing a water-softening material which comprises treating coffee particles with an acid to acidify the coffee particles without physical disintegration thereof and thereafter soaking the coffee particles in an aqueous solution of an alkaline alkali metal compound to impregnate the same with said compound.

2. A method of preparing a water-softening material which comprises treating coffee particles with an acid to acidify the coffee particles without physical disintegration thereof, then roasting the coffee particles, and thereafter soaking the coffee particles in an aqueous solution of an alkaline alkali metal compound to impregnate the same with said compound.

3. A method of preparing a water-softening material which comprises treating coffee particles with an acid to acidify the coffee particles without physical disintegration thereof and soaking the coffee particles in an aqueous solution of a salt of a metal contained in groups 3, 4, 5, 6, 7 and 8 of the periodic table to impregnate the same with said salt, and thereafter soaking the coffee particles in an aqueous solution of an alkaline alkali metal compound to impregnate the same with said compound.

4. A method of preparing a water-softening material which comprises treating coffee particles with a mineral acid to acidify the coffee particles without physical disintegration thereof and soaking the coffee particles in an aqueous solution of a salt of a metal contained in groups 3, 4, 5, 6, 7 and 8 of the periodic table to impregnate the same with said salt, then roasting the coffee particles, and thereafter soaking the coffee particles in an aqueous solution of an alkaline alkali metal compound selected from the group consisting of alkali metal silicate and alkali metal aluminate to impregnate the same with said compound.

5. A method of preparing a water-softening material which comprises treating coffee particles with an acid to acidify the coffee particles without physical disintegration thereof and soaking the coffee particles in an aqueous solution of a salt of a metal selected from the group consisting of salts of manganese, iron and aluminum to impregnate the same with said salt, then roasting the coffee particles, and thereafter soaking the coffee particles in an aqueous solution of an alkaline alkali metal compound to impregnate the same with said compound.

6. A method of preparing a water-softening material which comprises treating coffee particles with a mineral acid to acidify the coffee particles without physical disintegration thereof and soaking the coffee particles in an aqueous solution of a salt selected from the group consisting of water-soluble salts of manganese, iron, and aluminum to impregnate the same with said salt, then roasting the coffee particles at a temperature of about 300° C. to about 350° C., then washing the coffee particles with water to remove excess salt and acid, and thereafter soaking the coffee particles in an aqueous solution of an alkaline alkali metal compound selected from the group consisting of alkali metal aluminate and alkali metal silicate to impregnate the same with said compound.

7. A method of preparing a water-softening material which comprises treating coffee particles with a mineral acid to acidify the coffee particles without physical disintegration thereof and soaking the coffee particles in an aqueous solution of a manganese salt to impregnate the same with said salt, then roasting the coffee particles at a temperature of about 300° C. to about 350° C., and thereafter soaking the coffee particles in an aqueous solution of sodium silicate to impregnate the same with said silicate.

8. A method according to claim 7 wherein said mineral acid is sulphuric acid and said manganese salt is manganese sulphate.

9. A water-softening material of the base exchange type comprising acidified coffee particles impregnated with an alkaline alkali metal compound.

10. A water-softening material of the base exchange type comprising acidified coffee particles impregnated with a water-soluble salt of a metal contained in groups 3, 4, 5, 6, 7 and 8 of the periodic table, and with an alkaline alkali metal compound.

11. A water-softening material comprising acidified, roasted coffee particles impregnated with an alkaline alkali metal compound.

12. A water-softening material of the base exchange type comprising acidified coffee particles impregnated with a water-soluble salt of a metal selected from the group consisting of manganese, iron, and aluminum, and with an alkaline alkali metal compound selected from the group consisting of alkali metal silicate and alkali metal aluminate.

13. A water-softening material of the base exchange type comprising acidified coffee particles impregnated with a water-soluble manganese salt and with an alkali metal silicate.

SVEIN DAHL-RODE.